(12) United States Patent
Herbst

(10) Patent No.: US 7,269,320 B2
(45) Date of Patent: Sep. 11, 2007

(54) FIBER OPTIC CABLE WITH MINIATURE BEND INCORPORATED

(75) Inventor: Brian Herbst, Easley, SC (US)

(73) Assignee: AFL Telecommunications, LLC, Franklin, TN (US)

( * ) Notice: Subject to any disclaimer, the term of this patent is extended or adjusted under 35 U.S.C. 154(b) by 0 days.

(21) Appl. No.: 11/100,873

(22) Filed: Apr. 7, 2005

(65) Prior Publication Data

US 2006/0104578 A1    May 18, 2006

Related U.S. Application Data

(63) Continuation-in-part of application No. 10/988,197, filed on Nov. 13, 2004, now abandoned.

(51) Int. Cl.
*G02B 6/44* (2006.01)

(52) U.S. Cl. ................ 385/100; 385/113; 385/115

(58) Field of Classification Search .......... 385/100, 385/113, 115
See application file for complete search history.

(56) References Cited

U.S. PATENT DOCUMENTS

| 5,138,676 | A |   | 8/1992  | Stowe et al. |
|-----------|---|---|---------|--------------|
| 5,216,736 | A |   | 6/1993  | Essert |
| 5,452,393 | A |   | 9/1995  | Stowe et al. |
| 5,694,512 | A |   | 12/1997 | Gonthler et al. |
| 6,295,393 | B1|   | 9/2001  | Naganuma |
| 6,352,374 | B1| * | 3/2002  | Selfridge et al. ............. 385/76 |
| 6,363,191 | B1|   | 3/2002  | Gillham et al. |
| 6,563,971 | B1|   | 5/2003  | Burton et al. |
| 6,612,753 | B1| * | 9/2003  | Cryan et al. ............. 385/96 |

FOREIGN PATENT DOCUMENTS

| EP | 0 301 840    | 1/1989 |
| EP | O 357 429    | 7/1990 |
| EP | 0 984 310 A2 | 3/2000 |
| EP | 0 984 310 A3 | 3/2000 |
| EP | 1 099 133 B1 | 5/2001 |
| WO | WO98/29769   | 7/1998 |
| WO | WO 00/05612  | 2/2000 |

OTHER PUBLICATIONS

Jie Li, Eric A. Lindholm, Jana Horska, and Jaroslaw Abramczyk, "Advances in Design and Development of Optical Fibers for Harsh Environments", OFS Specialty Photonics Division, Avon, CT.
R. Norman, J. Weiss, and J. Krumhansl, "Development of Fibers Optic Cables for Permanent Geothermal Wellbore Deployment", Twenty-Sixth Workshop on Geothermal Reservoir Engineering, Stanford University, Stanford, California, Jan. 29-31, 2001.
Shell Technology EP (Step) EP Global Library, "Loss Increase in Optical Fibers Exposed", Noguchi, et al., vol. 3, 1985.

\* cited by examiner

*Primary Examiner*—Jennifer Doan
(74) *Attorney, Agent, or Firm*—Sughrue Mion, PLLC

(57) ABSTRACT

A fiber optic cable includes a miniature bend at one end, connecting a pair of optical fibers forming an originating light path with a return light path. The use of the miniature bend to connect to the originating and return light paths results in an end portion of the cable having a sufficiently small diameter to permit the cable to be blown into otherwise inaccessible locations, for example, the control line of an oil well.

15 Claims, 3 Drawing Sheets

FIBER OPTIC CABLE WITH MINIATURE BEND INCORPORATED

CROSS REFERENCE TO RELATED APPLICATIONS

This application is a continuation-in-part of U.S. patent application Ser. No. 10/988,197, filed on Nov. 13, 2004, now abandoned.

BACKGROUND OF THE INVENTION

1. Field of the Invention

The present invention provides a fiber optic cable for use in temperature measurement in locations inaccessible to humans, for example, the control line of an oil well. More specifically, it provides a double strand fiber optic cable incorporating a miniature bend at the end of the cable, connecting the double strands together.

2. Description of the Related Art

Temperature measurement in locations inaccessible to humans and equipment, for example, the hydraulic control line of an oil well, requires that some type of temperature sensing device be transported to the location where temperature measurement is desired, while overcoming the inaccessibility of the location to humans and equipment. The sensor may take the form of an optical fiber within a fiber optic cable, as explained in more detail below. The cable may be deployed by a procedure known as blowing, wherein high pressure air, water, or other medium is directed against the cable in the desired direction of travel, so that the frictional force imparted upon the cable forces the cable into the desired location. This procedure requires a cable having a sufficiently small diameter. If the distance involved is short, the cable may be pushed into position.

The use of fiber optic cables for temperature measurement in such locations has been proposed. The basic procedure is described in a paper presented by R. Normann, J. Wise, and J. Krumhansl, entitled "Points of Fibers Optic Cables For Permanent Geothermal Wellbore Deployment," presented at the 26$^{th}$ Workshop on Geothermal Reservoir Engineering at Stanford University on Jan. 29-31, 2001. Once the cable is deployed in the appropriate location, a high powered pulsed laser is directed down the length of the fiber. The laser undergoes scattering throughout the fiber, the bulk of which results from unavoidable density fluctuations within the fiber. This scattered radiation is known as Rayleigh scattering, and occurs at the same wavelength as the incident radiation. Raman scattering makes a much smaller contribution to the overall scattering. Raman scattering is divided into Stokes scattering, occurring at a longer wavelength than the original pulse, and anti-Stokes scattering, occurring at a shorter wavelength. The Stokes and anti-Stokes photons exchange thermal vibrational energy with the atoms within the fiber, with the anti-Stokes photons absorbing thermal vibrational energy from these atoms. The vibrational energy of the atoms is a function of temperature, and therefore the ratio of Stokes and anti-Stokes signals is also a function of temperature.

It is possible to determine the temperature of the fiber at intervals along its entire length by recording and analyzing the Stokes and anti-Stokes signals as a function of time, and calculating the origination depth based on the time these signals are received. The distance to the originating point is calculated by the well-known formula of multiplying the travel time of the signal by the speed of light. It has been found that a ten nanosecond pulse length provides the ability to receive temperature readings about one meter apart.

Accordingly, there is a need for a fiber optic cable suitable for temperature measurement within the hydraulic control lines of oil wells that is also structured to be capable of installation in the desired location by blowing or other presently available procedures.

SUMMARY OF THE INVENTION

The present invention provides a fiber optic cable having a pair of optical fibers connected by a miniature bend at one end. One optical fiber serves as the original light path, and the other optical fiber serves as the return light path.

The miniature bend can be formed from an optical fiber by removing the fiber's coating, etching the fiber to a decreased diameter, drawing the fiber, and then bending the fiber. Drawing is accomplished by heating the fiber and then pulling the fiber on either side of the heated section. The heated, smaller diameter portion may then be bent to the desired angle to form the miniature bend, which for most embodiments will be about 180°. The bend is next annealed to relieve stresses in the fiber and then encased in an appropriate enclosure. Lastly, the enclosure is sealed. The manufacture of miniature bends is further described in U.S. Pat. Nos. 5,138,676, 5,452,393, and 6,612,753, which are expressly incorporated herein by reference.

The miniature bend may be attached to the optical fibers prior to insertion of the fibers into a protective tube. The miniature bend is first spliced onto the two fibers. The combination of the two fibers and miniature bend is inserted into the tube. An end cap may be placed over the end of the tube wherein the miniature bend is located, and a jacket may be extruded over the tube. Alternatively, the miniature bend may be attached to a pair of fibers already within a tube by cutting the end of the tube and then splicing a miniature bend onto the exposed ends of the fibers.

The use of a miniature bend at the end of the cable provides a cable having both an originating and return light path. The miniature bend permits the connection of the originating path to the return path within a cable having a smaller diameter than would otherwise be possible. This is because a reduced diameter fiber is capable of guiding light around much smaller bends than the original fiber. The return signal may therefore be read from the same end of the cable at which it originated, which facilitates overlaying the original and return signal for temperature measurement.

The ability of an optical fiber to guide light around a bend is a function of the ratio of the bend radius and the diameter of the fiber. When a larger diameter fiber is bent, asymmetrical internal stresses result in an increased likelihood that the fiber will break. Additionally, attempting to bend a larger diameter fiber around a smaller bend radius results in increased light loss. Therefore, reducing the diameter of the fiber in the portion to be bent permits a much smaller bend radius to be used to connect the originating and return optical paths, permitting the use of a significantly smaller diameter end section of the cable.

It is therefore an object of the invention to provide a fiber optic cable having a miniature bend at one end.

It is another object of the invention to provide a fiber optic cable having an originating light path and a return light path, with the connection between the two light paths being sufficiently small so that the end portion of the cable has a sufficiently small diameter to permit the cable to be blown, injected, or pushed into a desired location.

It is a further object of the invention to provide an improved cable for temperature measurement in otherwise inaccessible locations.

These and other objects of the invention will become apparent through the following description and drawings.

BRIEF DESCRIPTION OF THE DRAWINGS

Like reference characters denote like elements throughout the drawings.

DETAILED DESCRIPTION OF THE PREFERRED EMBODIMENTS

The present invention provides a fiber optic cable having a miniature bend at one end, thereby permitting connection of the originating and return path within the cable, while minimizing the diameter of the end portion of the cable.

Figure 1:
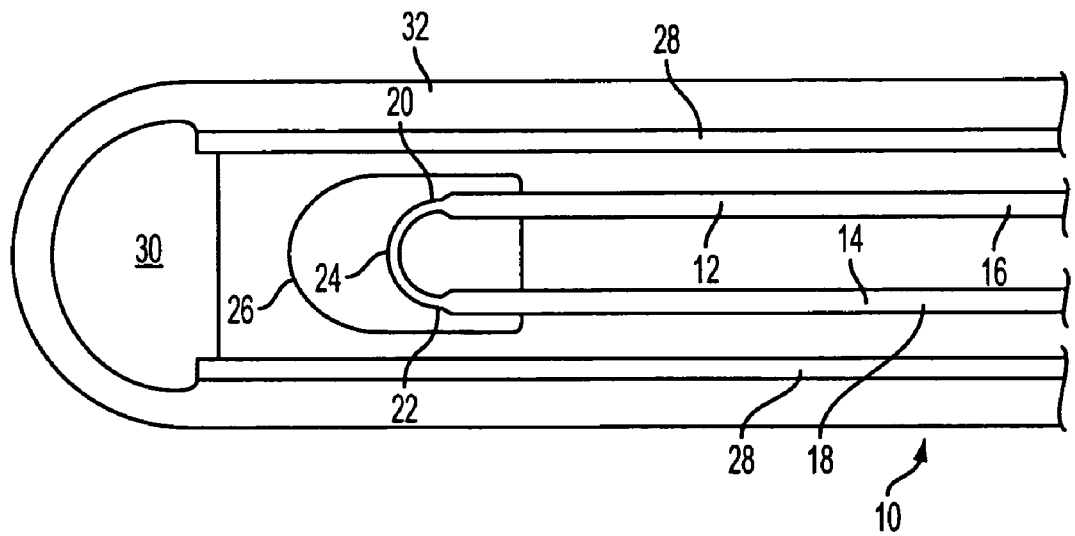
FIG. 1 is a side cross sectional view of an end portion of a cable according to the present invention.

Referring to FIG. 1, the end portion of a cable 10 is illustrated. The cable 10 includes a pair of optical fibers 12, 14. A miniature bend 24 is attached to the ends 20, 22, connecting the ends 20, 22 together, thereby forming a complete optical path down the fiber 12, through the miniature bend 24, and back through the fiber 14. The miniature bend 24 is surrounded by a protective casing 26, which in some preferred embodiments may be a capillary tube that may be made from glass. The fibers 12, 14, and the protective casing 26, are contained within a tube 28 that may be made from a metal such as stainless steel or from polymeric material. The tube includes a seal 30 at its terminating end. A jacket 32 may surround the seal 30 and tube 28.

Figure 3:
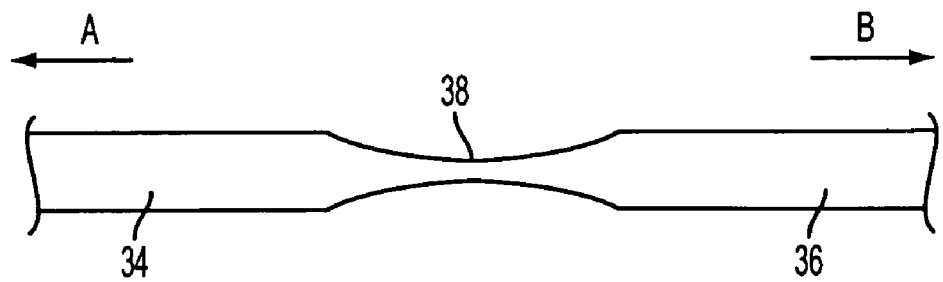
FIG. 3 is a diagrammatic view of a fiber drawing operation.
Figure 4:
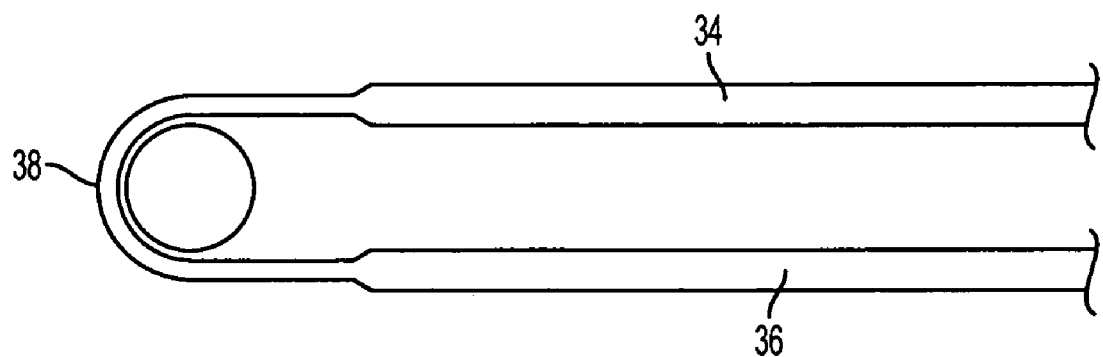
FIG. 4 is a diagrammatic view of a fiber bending operation.

The cable 10 may be made by first providing the fibers 12, 14 connected by the miniature bend 24. The making of a miniature bend is best illustrated in FIGS. 3-4, although the miniature bend 24 and its protective casing 26 will typically be supplied as a pre-assembled unit at the beginning of manufacture of the cable 10. The optical fiber's coating is first removed. The fiber is next etched to reduce its diameter, and drawing by applying a force on the fiber portion 34 in the direction of arrow A, and by a force on the fiber portion 36 in the direction of arrow B, while applying heat to the fiber portion 38, which will become narrowed as the fiber portions 34, 36 are pulled apart. The fiber portion 38 is then bent to the desired degree, which will typically be about 180°. The miniature bend is then annealed. A protective casing 26 is applied over the miniature bend 24. The miniature bend 24 may then be spliced to the ends 20, 22 of the fibers 12, 14, and the protective casing 26 and the fibers 12, 14 may be inserted into the tube 28. A seal 30 is applied over the end of the tube 28, and a jacket 32 may be applied over the seal 30 and tube 28.

Figure 2:
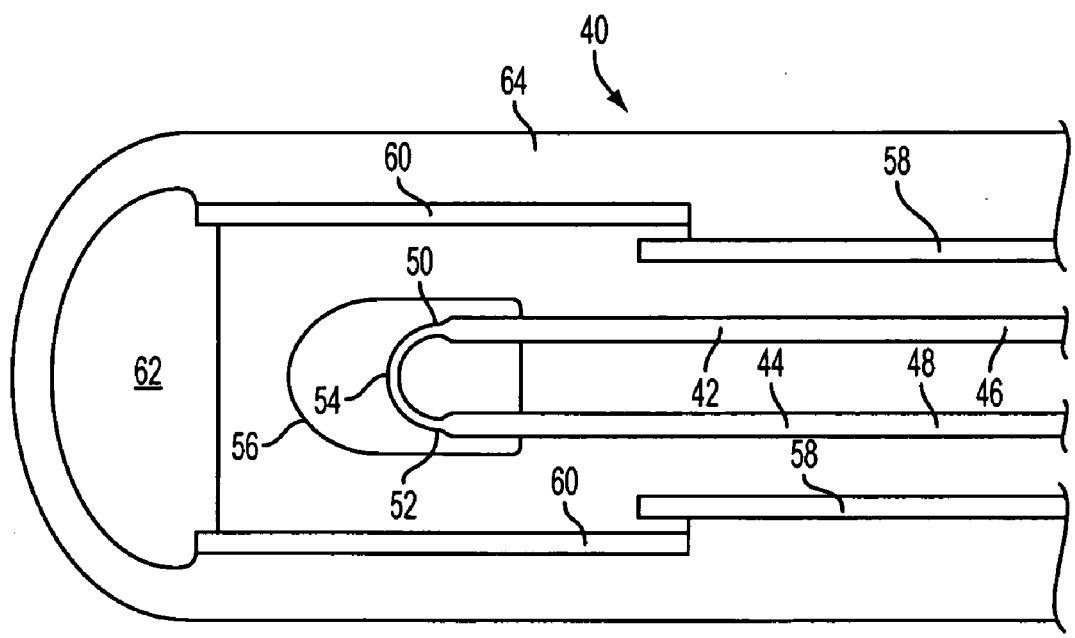
FIG. 2 is a side cross sectional view of another embodiment of an end portion of a cable according to the present invention.

An alternative embodiment of the cable 40 is illustrated in FIG. 2. The cable 40 includes a pair of optical fibers 42, 44. A miniature bend 54, connecting the ends 50, 52 of the fibers 42, 44, is contained within a protective casing 56, which may be a capillary tube that may be made from glass. The fibers 42, 44 and protective casing 56 are contained within a tube 58 having an end portion 60. A seal 62 is located at one end of the end portion 60. A jacket 64 surrounds the tube 28, end portion 60, and seal 62.

The cable 40 may be made by providing the fibers 42, 44 within the tube 58. The tube 58 may be cut to expose the ends 50, 52 of the fibers 42, 44. The miniature bend 54 and its protective casing 56 will typically be supplied as a pre-assembled unit at the beginning of manufacture of the cable 10. The miniature bend 54 may be spliced to the ends 50, 52 of the fibers 42, 44. The end portion 60 of the tube 58 is secured to the end of the tube 58. A seal 62 is secured to the end portion 60 either before or after securing the end portion 60 to the tube 58. A jacket 64 may then be extruded over the seal 62, end portion 60, and tube 58.

Figure 5:
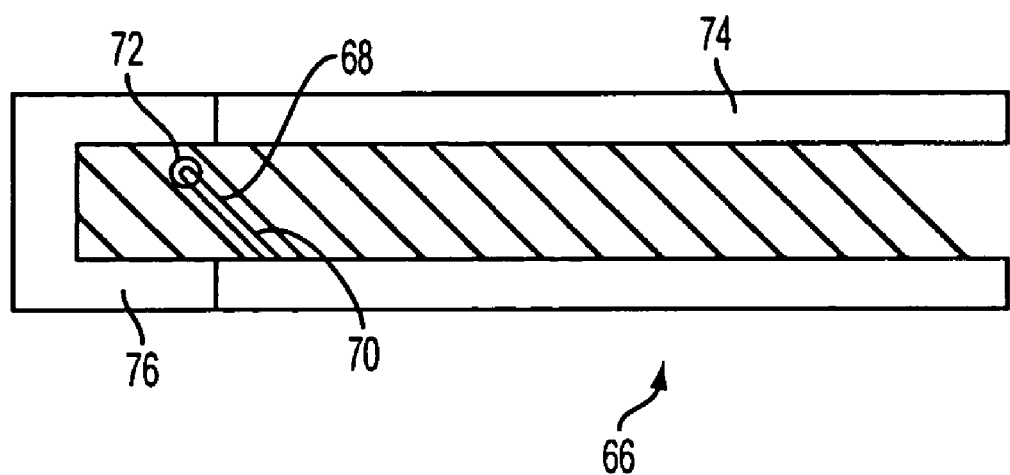
FIG. 5 is a cross sectional side view of an end portion of another embodiment of the cable according to the present invention.

FIG. 5 illustrates yet another embodiment of the cable 66. The cable 66 may be made using optical fibers, miniature bends, and tubes as illustrated in any of FIGS. 1-2. Several tubes 68, each containing two optical fibers 70 connected by miniature bends 72 at their terminal ends, may be stranded together, possibly with filler material interspersed therein. Jacket material 74 may be extruded over the stranded tubes 68, with the seal 76 placed over the end of the resulting cable. Such a cable therefore provides multiple optical fibers 70, which may provide either redundant capability in the event of failure of one of the optical fibers 70, or alternatively may provide multiple signals, each acting as a check against the other signals.

The use of the miniature bend 24, 54 to connect the originating and return fiber paths permits the connection between the originating fiber path and return fiber path to be housed within a cable having an end portion with a minimized diameter. Therefore, a cable 10, 40, or 66 may be made sufficiently small so that it may be positioned in a location that is otherwise inaccessible by a procedure known as blowing. Blowing is essentially directing high pressure air, water, or other medium against the cable in order to move it in a desired direction, for example, down the hydraulic control line of an oil well.

In use, the cables 10, 40, or 66 may be blown into a desired location as described above. Once the cable 10, 40, or 66 is properly positioned, a pulsed laser may then be directed down one of the optical fibers. As the laser passes through the fibers, and undergoes scattering, the Stokes and anti-Stokes photons exchange thermal vibrational energy with the atoms within the fiber, so that, when the returning Stokes and anti-Stokes scattering reaches the top of both the originating and the return fibers, their ratio may be measured to compute the temperature. Additionally, the time required for the Stokes and anti-Stokes photons to return may be multiplied by the speed of light, thereby determining the distance down the length of the cable at which temperature is measured.

The present invention therefore provides a fiber optic cable having a miniature bend at one end, thereby permitting a connection between an originating and return light path without the need for an enlarged end section of the cable. The invention further provides an improved cable for use in measuring temperature in otherwise inaccessible locations by providing a cable that may be blown into these locations.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A fiber optic cable, comprising:
a pair of optical fibers, each optical fiber defining a diameter and a terminal end;
a miniature bend forming an optical connection between the terminal ends of the fibers, and the miniature bend defining a diameter that is smaller than the diameter of the optical fibers; and
a tube surrounding substantially the entire length of the pair of optical fibers, including the miniature bend, wherein the tube has a seal at the end of the cable where the miniature bend is formed.

2. The fiber optic cable according to claim 1, wherein the tube is made from a material selected from the group consisting of metals and polymeric materials.

3. The fiber optic cable according to claim 1, further comprising a jacket surrounding the tube.

4. The fiber optic cable according to claim 1, further comprising a protective casing disposed around the miniature bend.

5. The fiber optic cable according to claim 4, wherein the protective casing is made from glass.

6. A method of making a fiber optic cable, comprising:
providing a pair of optical fibers, each optical fiber defining a terminal end and a diameter; and
attaching a miniature bend between the terminal ends of the optical fibers, the miniature bend defining a diameter that is smaller than the diameter of the optical fibers; and;
providing a tube that surrounds substantially the entire length of the pair of optical fibers, including the miniature bend;
wherein the miniature bend is made by a process including annealing the miniature bend.

7. A method of making a fiber optic cable, comprising:
providing a pair of optical fibers, each optical fiber defining a terminal end and a diameter; and
attaching a miniature bend between the terminal ends of the optical fibers, the miniature bend defining a diameter that is smaller than the diameter of the optical fibers;
inserting the optical fibers and miniature bend into a tube that surrounds substantially the entire length of the optical fibers, including the miniature bend; and
sealing an end of the tube corresponding to the miniature bend.

8. A method of making a fiber optic cable, comprising:
providing a pair of optical fibers, each optical fiber defining a terminal end and a diameter; and
attaching a miniature bend between the terminal ends of the optical fibers, the miniature bend defining a diameter that is smaller than the diameter of the optical fibers;
inserting the optical fibers and miniature bend into a tube;
providing multiple tubes, each tube containing a pair of optical fibers therein, each optical fiber defining a diameter and a terminal end, each pair of optical fibers being connected at their terminal ends by a miniature bend having a diameter that is smaller than the diameter of the optical fibers;
stranding the tubes together; and
providing a jacket over the stranded tubes.

9. A method of making a fiber optic cable, comprising:
providing a pair of optical fibers, each optical fiber defining a terminal end and a diameter;
attaching a miniature bend between the terminal ends of the optical fibers, and the miniature bend defining a diameter that is smaller than the diameter of the optical fibers;
wherein the optical fibers are provided within a tube that surrounds substantially the entire length of the optical fibers, prior to attaching the miniature bend to the optical fibers; and
the tube is cut to access the terminal ends of the optical fibers prior to attaching the miniature bend to the optical fibers.

10. A method of making a fiber optic cable, comprising:
providing a pair of optical fibers, each optical fiber defining a terminal end and a diameter;
attaching a miniature bend between the terminal ends of the optical fibers, and the miniature bend defining a diameter that is smaller than the diameter of the optical fibers; and
securing an end section having a seal to the tube, encapsulating the miniature bend;
wherein the optical fibers are provided within a tube that surrounds substantially the entire length of the optical fibers, prior to attaching the miniature bend to the optical fibers.

11. The method according to claim 10, further comprising providing a jacket over the tube.

12. A method of making a fiber optic cable, comprising:
providing a pair of optical fibers, each optical fiber defining a terminal end and a diameter;
attaching a miniature bend between the terminal ends of the optical fibers, the miniature bend defining a diameter that is smaller than the diameter of the optical fibers;
providing multiple tubes, each tube containing a pair of optical fibers therein, each optical fiber defining a diameter and a terminal end, each pair of optical fibers being connected at their terminal ends by a miniature bend having a diameter that is smaller than the diameter of the optical fibers;
stranding the tubes together; and
providing a jacket over the stranded tubes;
wherein the optical fibers are provided within a tube prior to attaching the miniature bend to the optical fibers.

13. A method of measuring temperature in a location inaccessible to humans, the method comprising:
providing a fiber optic cable, comprising: a pair of optical fibers, each optical fiber defining a diameter and a terminal end; and a miniature bend forming an optical connection between the terminal ends of the fibers, the miniature bend defining a diameter that is smaller than the diameter of the optical fibers;
placing the cable within a location wherein the temperature measurement is desired;
directing light along the first optical fiber;
receiving returning light from the fiber optic cable;
measuring the Stokes scattering and anti-Stokes scattering of returning light; and
calculating a temperature based on a ratio of Stokes and anti-Stokes scattering.

14. The method according to claim 13, further comprising:

measuring a time between directing light along the first optical fiber; and determining a position along the cable at which the temperature occurs by multiplying the time by the speed of light.

15. The method according to claim 13, wherein placing the cable within a location wherein temperature measurement is desired is accomplished by blowing the cable into the location wherein temperature measurement is desired.

* * * * *